Patented Dec. 8, 1936

2,063,856

UNITED STATES PATENT OFFICE 2,063,856

SUCCINIC ACID RESIN

Israel Rosenblum, Jackson Heights, N. Y.

No Drawing. Application December 7, 1933, Serial No. 701,364

11 Claims. (Cl. 260—8)

The present invention relates to the manufacture of polyhydric alcohol-polybasic aliphatic acid resins and has for its object to produce a resin of this type characterized by a high degree of durability and water-proofness and also by solubility in varnish oils, petroleum distillates, coal tar distillates, and other resin solvents.

In accordance with the present invention a trihydric or equivalent alcohol, such as glycerol, polyglycerol, etc. is caused to react with succinic acid and with one or more acids obtainable on hydrolysis of a fatty oil or fat under such conditions and in such proportions that a substantially neutral resin is obtained which is free of any such amount of uncombined hydroxyl groups as would impair the drying properties thereof, the resin being capable of producing air-drying and baking varnishes.

I have found that when, for example, glycerol, succinic acid and linoleic acid are caused to react in the manner generally practiced in the art, that is, by mixing the three ingredients together and heating them to elevated temperatures, two separate layers are formed which even prolonged heating at elevated temperatures will not cause to combine to form a homogeneous resin. The lower of the two layers is composed primarily of the glycerol esters of the succinic acid and continued heating tends to convert such lower layer to an infusible, and generally insoluble mass which ultimately begins to char.

Similarly unsatisfactory results are obtained if the partial glycerol ester of succinic acid is first formed and then heated with the linoleic or other fatty oil acid, such partial ester being apparently incapable of reacting to any considerable extent with the fatty oil acid to produce the mixed glycerol esters of the two acids.

I have, however, found that the mixed glycerol esters of succinic acid and an acid obtainable upon hydrolysis of an oil or fat can readily be obtained without danger of formation of two immiscible layers and without danger of gelling or conversion into the infusible condition, by first reacting the glycerol with the monobasic fatty acid to produce the mono and/or diester of such acid, after which such ester or esters are reacted with succinic acid to neutralize substantially completely the remaining hydroxyl groups. In this way I obtain a homogeneous product of resinous properties which is fusible and soluble, is extremely durable and water-proof, and is practically neutral.

The following examples describe in greater detail several modes of procedure embodying the invention.

Example 1

| | Grams |
|---|---|
| Monolinoleic glycerol ester _____(1 mol.)__ | 354 |
| Succinic acid _____do_____ | 118 | are heated gradually; after being heated at 175–180° C. the material is clear when hot; at 200–210° it is clear also when cold. The temperature is then raised to 240° C. The reaction proceeds rapidly at this temperature, as is shown by the following decrease in acid number:

After ½ hour, the acid number is_____ 58
After 1 hour, the acid number is_____ 43
After 1½ hour, the acid number is_____ 36
After 2 hours, the acid number is_____ 28
After 3½ hours, the acid number is_____ 17

At this point the heating is topped. The material is a heavy plastic and is soluble in all varnish solvents, such as petroleum thinners and coal tar solvents. The solutions are miscible with other varnish vehicles, resin solutions, oil varnishes, varnish oils, etc.

The monoleic glycerol ester is produced in known manner by the reaction of approximately equimolecular proportions of glycerol and linoleic acid, the heating being preferably continued until a monoester of negligible acid number (about 1) is obtained.

Example 2

| | Grams |
|---|---|
| Dilinoleic glycerol ester_____(2 mols) __ | 1232 |
| Succinic acid_____(1 mol.) __ | 118 | are heated as indicated in Example 1. After one hour at 240° C., the acid number is 20, and is reduced to 10 in four (4) more hours of heating. The heating is continued until the desired viscosity is obtained. In its solubility and compatibility with other varnish products the resin is similar to that obtained according to Example 1.

The dilinoleic acid ester is made in a manner similar to the manufacture of the mono-ester, except that twice as much acid is employed.

Example 3

Instead of the linoleic esters of glycerol, the mono and diesters of other similar fatty acids may be used, the products obtained having properties similar to those of the resins of Examples 1 and 2. Thus there may be used the acids obtained upon hydrolysis of wood oil, soya bean oil, olive oil, sesame oil, rapeseed oil, rubber seed oil, fish oil, etc. If desired, mixtures of the mono and diesters may be employed, and also mixtures of the partial esters of different fatty oil or fat acids.

I claim:

1. The method of producing oil acid-modified polyhydric alcohol-polybasic acid resins suitable for the manufacture of coating compositions wherein the polyhydric alcohol is glycerol and the polybasic acid is succinic acid, which comprises reacting glycerol and the substantially theoretical amount of an acid obtained on hydrolysis of an oil or fat required to convert substantially all of the glycerol into the partial glycerol ester of such acid, and then reacting such partial ester with substantially the theoretical amount of succinic acid required to neutralize the same until a soluble, homogeneous resinous condensation product is obtained.

2. The method of producing oil acid-modified polyhydric alcohol-polybasic acid resins suitable for the manufacture of coating compositions wherein the polyhydric alcohol is glycerol and the polybasic acid is succinic acid, which comprises reacting, in the absence of any substantial quantity of free glycerol, a partial glycerol ester of an acid obtainable on hydrolysis of an oil or fat with substantially the theoretical amount of succinic acid required to neutralize the same until a soluble, homogeneous resinous condensation product is obtained.

3. The method of producing oil acid-modified polyhydric alcohol-polybasic acid resins suitable for the manufacture of coating compositions wherein the polyhydric alcohol is glycerol and the polybasic acid is succinic acid, which comprises reacting glycerol and substantially the theoretical amount of the acids of a drying oil required to convert substantially all of the glycerol into the partial glycerol ester or esters of such acid, and then reacting the partially esterified glycerol with substantially the theoretical amount of succinic acid required to neutralize the same until a soluble, homogeneous resinous condensation product is obtained.

4. The method of producing oil acid-modified polyhydric alcohol-polybasic acid resins suitable for the manufacture of coating compositions wherein the polyhydric alcohol is glycerol and the polybasic acid is succinic acid, which comprises reacting, in the absence of any substantial quantity of free glycerol, a partial glycerol ester of soya bean oil acids with substantially the theoretical amount of succinic acid required to neutralize the same until a soluble, homogeneous resinous condensation product is obtained.

5. The method of producing oil acid-modified polyhydric alcohol-polybasic acid resins suitable for the manufacture of coating compositions wherein the polyhydric alcohol is glycerol and the polybasic acid is succinic acid, which comprises reacting one mol. of glycerol with one mol. of the acids of a drying oil until a mono-ester of negligible acid number is obtained and then reacting one mol. of such partial ester with one mol. of succinic acid at about 240° C. until a soluble, homogeneous resinous product is obtained.

6. The method of producing oil acid-modified polyhydric alcohol-polybasic acid resins suitable for the manufacture of coating compositions wherein the polyhydric alcohol is glycerol and the polybasic acid is succinic acid, which comprises reacting one mol. of glycerol with two mols of drying oil fatty acids until the glycerol di-ester having a negligible acid number is obtained, and then reacting one mol. of such di-ester with one-half mol. of succinic acid at about 240° C. until a soluble, homogeneous resinous product is obtained.

7. The substantially neutral, homogeneous, soluble, resinous reaction product of approximately one mol. of glycerol, one mol. of a fatty acid obtainable on hydrolysis of a fatty oil or of a fat and one mol. of succinic acid.

8. The substantially neutral, homogeneous, soluble reaction product of approximately one mol. of glycerol, one mol. of unsaturated oil acid and one mol. of succinic acid.

9. The homogeneous, soluble resinous reaction product of the partial glycerol ester of a fatty oil acid and approximately the theoretical amount of succinic acid required to neutralize the same, said product having an acid number of 25 or below.

10. A homogeneous, soluble resinous product comprising the mixed glycerol ester of succinic acid and a fatty oil acid.

11. A homogeneous, soluble resinous product comprising the mixed glycerol ester of succinic acid and a drying oil acid.

ISRAEL ROSENBLUM.